US009821749B2

(12) United States Patent
Hotta et al.

(10) Patent No.: US 9,821,749 B2
(45) Date of Patent: Nov. 21, 2017

(54) SIDE AIRBAG APPARATUS

(71) Applicant: TOYODA GOSEI CO., LTD., Kiyosu-shi, Aichi-ken (JP)

(72) Inventors: Masashi Hotta, Kiyosu (JP); Takashi Ilda, Kiyosu (JP); Yuji Sato, Kiyosu (JP); Norio Mizuno, Kiyosu (JP); Yuta Okayama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/186,702

(22) Filed: Jun. 20, 2016

(65) Prior Publication Data

US 2017/0008481 A1 Jan. 12, 2017

(30) Foreign Application Priority Data

Jul. 6, 2015 (JP) .................................. 2015-135303

(51) Int. Cl.
*B60R 21/233* (2006.01)
*B60R 21/231* (2011.01)

(52) U.S. Cl.
CPC ...... *B60R 21/23138* (2013.01); *B60R 21/233* (2013.01); *B60R 2021/23146* (2013.01); *B60R 2021/23324* (2013.01)

(58) Field of Classification Search
CPC ............ B60R 21/23138; B60R 21/233; B60R 2021/23146; B60R 2021/23324
See application file for complete search history.

(56) References Cited

U.S. PATENT DOCUMENTS

| 6,270,113 | B1* | 8/2001 | Wipasuramonton | B60R 21/23138 |
| | | | | 280/728.1 |
| 6,478,329 | B1* | 11/2002 | Yokoyama | B60R 21/23138 |
| | | | | 280/729 |
| 9,475,446 | B2* | 10/2016 | Hotta | B60R 21/207 |
| 2012/0056410 | A1* | 3/2012 | Yamamoto | B60R 21/23138 |
| | | | | 280/730.2 |
| 2012/0200072 | A1* | 8/2012 | Fukawatase | B60R 21/23138 |
| | | | | 280/741 |

(Continued)

FOREIGN PATENT DOCUMENTS

| JP | 2015-030322 A | 2/2015 |
| WO | 2013/014773 A1 | 1/2013 |

(Continued)

*Primary Examiner* — Drew J Brown
(74) *Attorney, Agent, or Firm* — Posz Law Group, PLC

(57) ABSTRACT

A lateral partition of a side airbag apparatus extends in a front-rear direction to divide the interior of an airbag into an upper inflation chamber and a lower inflation chamber. A vertical partition extends vertically and includes a communication portion. The vertical partition divides the upper inflation chamber into an upper-rear inflation chamber, to which inflation gas from a gas generator is supplied, and an upper-front inflation chamber, to which the inflation gas is supplied via the communication portion. An inner tube regulates the flow of the inflation gas to direct to the upper-rear inflation chamber and the lower inflation chamber. The rear ends of two first fabric portions of the vertical partition are joined to the upper parts of the front ends of two second fabric portions of the inner tube by a first vertical joint portion.

8 Claims, 11 Drawing Sheets

(56) References Cited

U.S. PATENT DOCUMENTS

| | | | |
|---|---|---|---|
| 2012/0248746 A1* | 10/2012 | Yamamoto | B60R 21/23138 280/729 |
| 2014/0035264 A1* | 2/2014 | Fukushima | B60R 21/23138 280/730.2 |
| 2014/0159354 A1 | 6/2014 | Fujiwara | |
| 2015/0014970 A1 | 1/2015 | Fujiwara | |
| 2016/0159310 A1* | 6/2016 | Kobayashi | B60R 21/233 280/729 |
| 2016/0159313 A1* | 6/2016 | Fujiwara | B60R 21/233 280/729 |
| 2016/0200280 A1* | 7/2016 | Fujiwara | B60N 2/42 280/729 |
| 2017/0028958 A1* | 2/2017 | Goto | B60R 21/233 |

FOREIGN PATENT DOCUMENTS

| | | | |
|---|---|---|---|
| WO | 2015/015912 A1 | 2/2015 | |
| WO | WO2015045613 A1 * | 5/2015 | B60R 21/231 |

\* cited by examiner

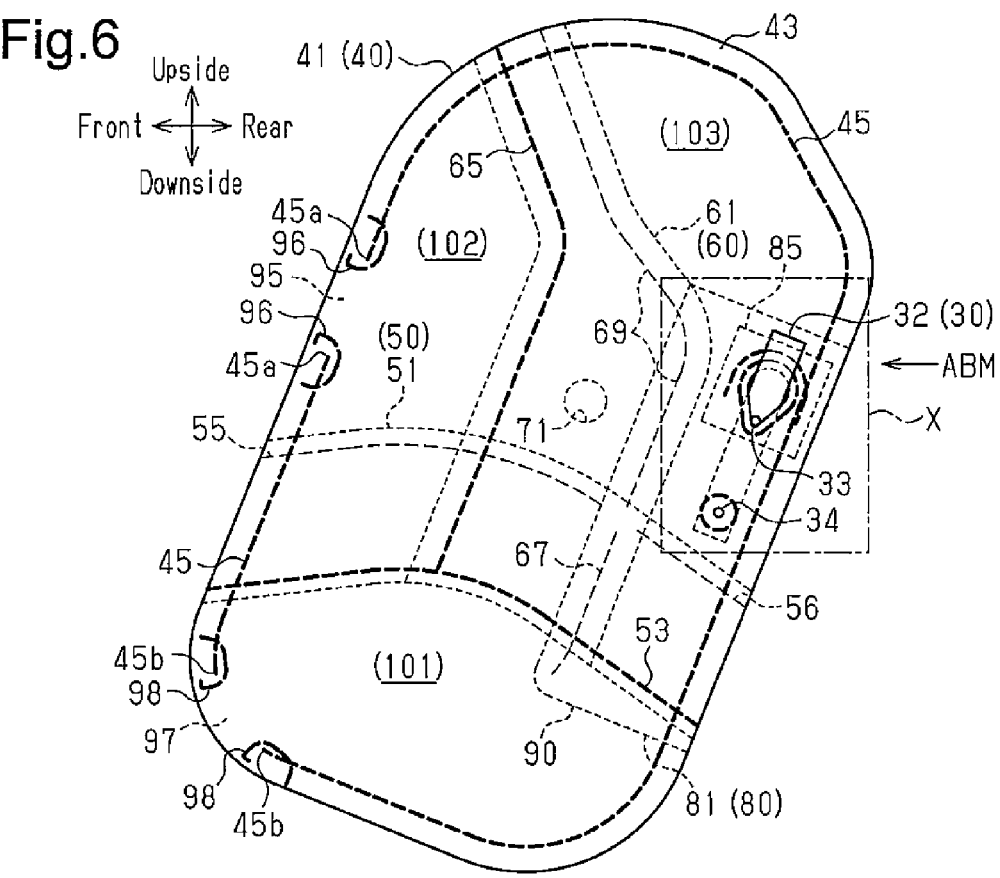
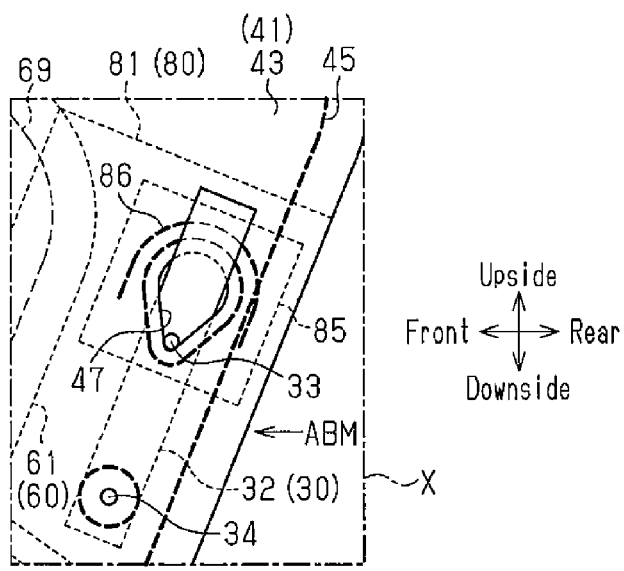
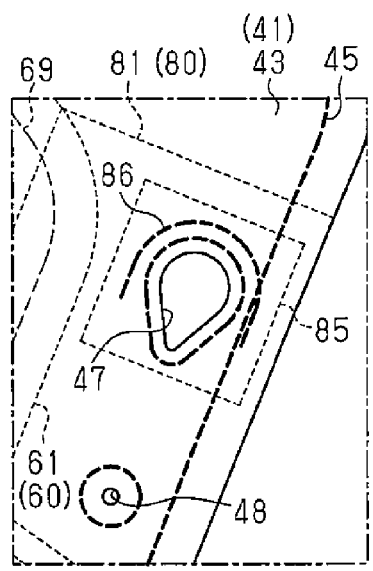

SIDE AIRBAG APPARATUS

BACKGROUND OF THE INVENTION

The present invention relates to a side airbag apparatus that protects an occupant seated in a vehicle seat by deploying and inflating an airbag on a side of the occupant when an impact is applied to the vehicle from the side of the vehicle seat.

A side airbag apparatus having an airbag and a gas generator is effective as an apparatus that protects an occupant seated in an automobile seat when an impact is applied to the seat from a side, for example, due to a side collision.

For example, Japanese Laid-Open Patent Publication No. 2015-30322 discloses a side airbag apparatus shown in FIGS. 16 and 17, which includes an airbag 120. The outer envelope of the airbag 120 is formed by an airbag main body 122. The interior of the airbag main body 122 is divided into an upper inflation chamber and a lower inflation chamber 124, which is located below the upper inflation chamber, by a lateral partition 123, which extends in the front-rear direction.

The upper inflation chamber is divided into an upper-rear inflation chamber 128 and an upper-front inflation chamber 127 by a vertical partition 126, which extends vertically and has a communication portion 125. The upper-rear inflation chamber 128 receives inflation gas from a gas generator 121. The upper-front inflation chamber 127 is located on the front side of the upper-rear inflation chamber 128 and receives inflation gas via the communication portion 125.

An inner tube 129 is provided at the rear end in the airbag main body 122. The inner tube 129 extends vertically and bridges the upper-rear inflation chamber 128 and the lower inflation chamber 124. The inner tube 129 regulates the flow of inflation gas from the gas generator 121 to direct the flow toward the upper-rear inflation chamber 128 and the lower inflation chamber 124. The lower part of the inner tube 129 configures a check valve 130. The check valve 130 allows inflation gas to flow from the upper-rear inflation chamber 128 to the lower inflation chamber 124, but restricts flow in the opposite direction, or the flow of inflation gas from the lower inflation chamber 124 to the upper-rear inflation chamber 128.

The above described side airbag apparatus inflates the lower inflation chamber 124, the upper-rear inflation chamber 128, and the upper-front inflation chamber 127 with appropriate internal pressures to effectively protect the upper body of the occupant against impacts.

In the above described side airbag apparatus, the inner tube 129 and the vertical partition 126 are configured by a single fabric piece 131. The fabric piece 131 is folded in half at the center to form a pair of fabric portions 132, 133. Each of the fabric portions 132, 133 has a vertical joint portion 134 at the middle section in the front-rear direction. The vertical joint portions 134 extend vertically to form the inner tube 129 on the rear side of the vertical joint portions 134. Also, the vertical partition 126 is formed on the front side of the vertical joint portions 134.

However, since the inner tube 129 and the vertical partition 126 are formed by the single fabric piece 131 in the side airbag apparatus of Japanese Laid-Open Patent Publication No. 2015-30322, the location at which the vertical joint portion 134 is formed cannot be easily determined. That is, the vertical joint portion 134 cannot be easily positioned. As a result, it is difficult to form the vertical joint portions 134 accurately at predetermined locations on the folded fabric portions 132, 133. That is, it is difficult to accurately join the vertical partition 126 to the inner tube 129.

SUMMARY OF THE INVENTION

Accordingly, it is an objective of the present invention to provide a side airbag apparatus that accurately joins a vertical partition to an inner tube.

To achieve the foregoing objective and in accordance with one aspect of the present invention, a side airbag apparatus is provided that includes an airbag main body, which is configured to be deployed and inflated beside an occupant seated in a vehicle seat, a gas generator, which supplies inflation gas to the airbag main body, a lateral partition, which is arranged in the airbag main body and divides at least a part of an interior of the airbag main body into an upper inflation chamber and a lower inflation chamber, which is located below the upper inflation chamber, a vertical partition, and an inner tube. The vertical partition is arranged in the airbag main body and has a communication portion. The vertical partition divides the upper inflation chamber into an upper-rear inflation chamber, to which the inflation gas from the gas generator is supplied, and an upper-front inflation chamber, which is located forward of the upper-rear inflation chamber and to which the inflation gas is supplied via the communication portion. The inner tube is arranged in the airbag main body and regulates a flow of the inflation gas from the gas generator to direct the flow toward the upper-rear inflation chamber and the lower inflation chamber. The inner tube includes, at a lower part, a check valve, which restricts a flow of the inflation gas from the lower inflation chamber to the upper-rear inflation chamber. The vertical partition includes two first fabric portions arranged in a width direction of the vehicle seat. The inner tube includes two second fabric portions arranged in the width direction. A rear end of each first fabric portion is joined to an upper part of a front end of at least one of the second fabric portions by a first vertical joint portion.

BRIEF DESCRIPTION OF THE DRAWINGS

FIG. 6 is a side view illustrating the airbag module, as viewed from the inner side of the automobile, with the airbag main body in an uninflated and spread state in the embodiment.

FIG. 7A is an enlarged partial side view illustrating section X in FIG. 6.

FIG. 7B is a partial side view illustrating a state in which the gas generator is yet to be attached to the airbag main body.

DETAILED DESCRIPTION OF THE PREFERRED EMBODIMENTS

An automobile side airbag apparatus according to one embodiment of the present invention will now be described with reference to FIGS. 1 to 15.

In the following description, the direction in which the automobile advances forward will be referred to as the front, and the reverse direction will be referred to as the rear. The center of the width direction of the automobile (automobile width direction) is used as a reference. A side closer to the center in the automobile width direction will be referred to as "inner side" of the automobile, while a side farther from the center in the automobile width direction will be referred to "outer side" of the automobile. It is now assumed that an occupant having a size equivalent to a crash test dummy is seated in the automobile seat. The crash test dummy is, for example, the AM50 (the model that covers 50% of the American adult male population) of the world side impact dummy (WorldSID).

Figure 1:
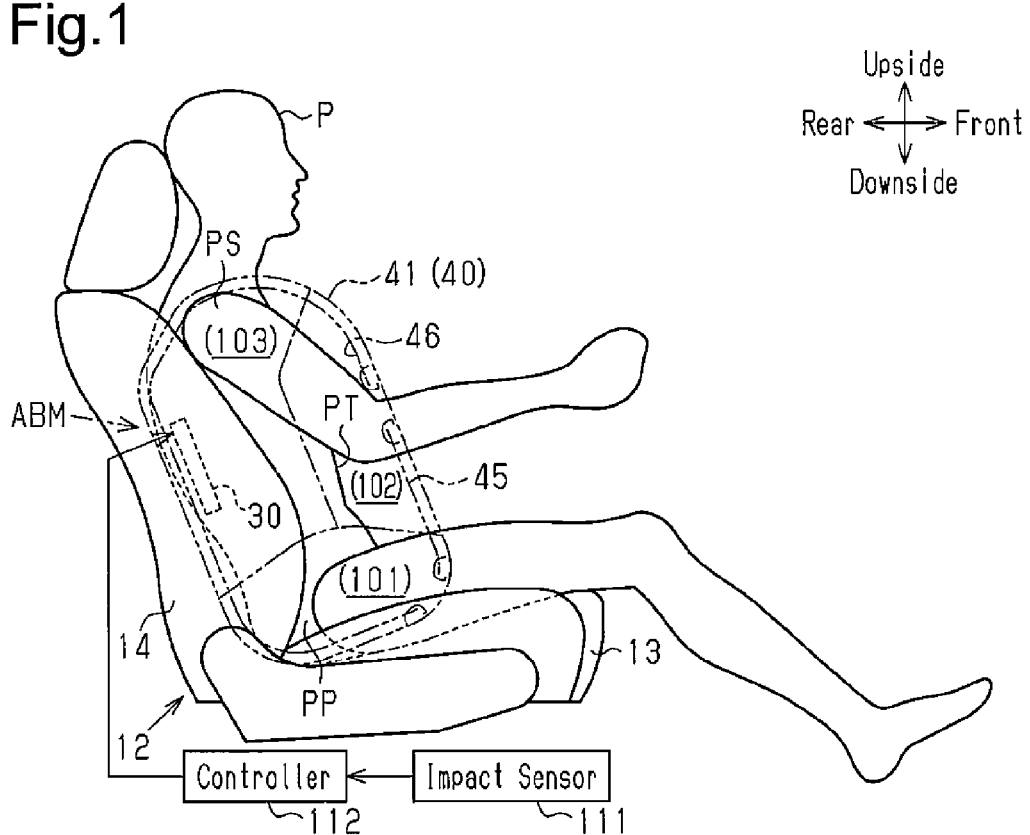
FIG. 1 is a side view of an automobile side airbag apparatus according to one embodiment, illustrating, together with an occupant, the apparatus installed in an automobile seat.
Figure 2:
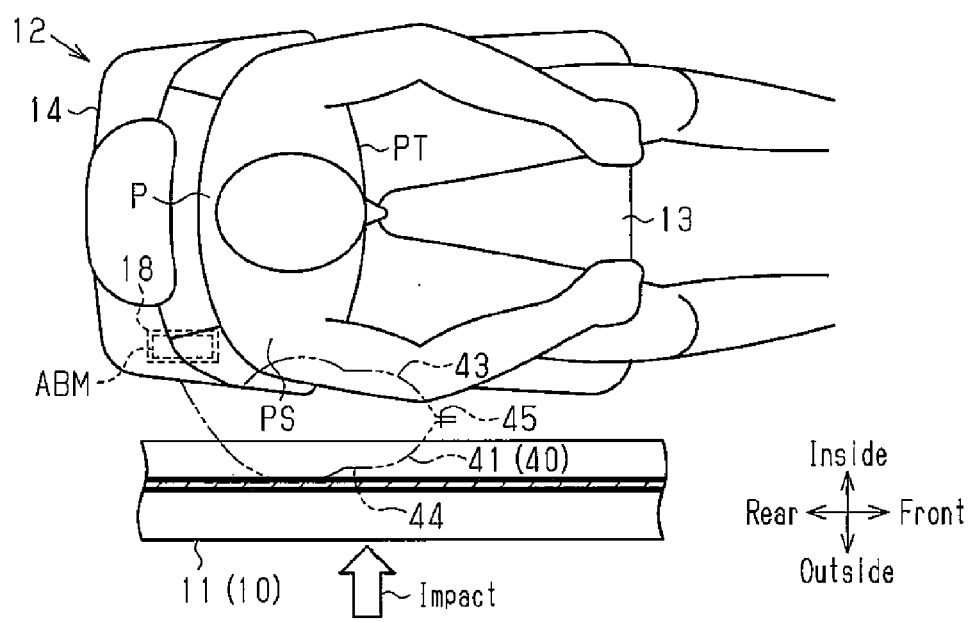
FIG. 2 is a cross-sectional plan view of the positional relationship of the automobile seat, an airbag, the occupant, and a body side portion according to the embodiment.
Figure 3:
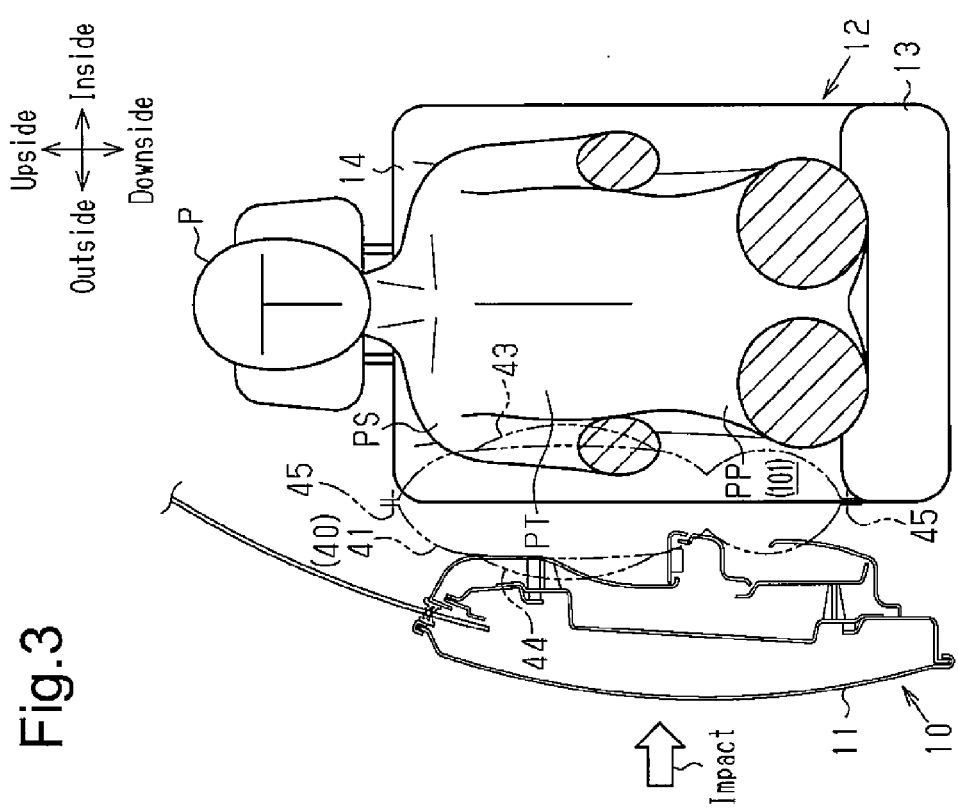
FIG. 3 is a cross-sectional front view of the positional relationship of the automobile seat, the airbag, the occupant, and the body side portion according to the embodiment.

As shown in FIGS. 1 to 3, an automobile 10, which is a vehicle, has an automobile seat 12, which is a vehicle seat, arranged on the inner side of a body side portion 11. The body side portion 11 refers to an automobile component that is located on a side of the automobile 10, and mainly corresponds to doors and pillars. For example, the part of the body side portion 11 corresponding to the front seat includes a front door and a center pillar (B-pillar). The part of the body side portion 11 corresponding to the rear seat includes a rear part of the side door (rear door), a C-pillar, a front part of a wheel well, and the rear quarter.

The automobile seat 12 includes a seat cushion 13 and a seat back 14, which extends upward from the rear end of the seat cushion 13. The tilt angle of the seat back 14 is adjustable. The automobile seat 12 is arranged in the passenger compartment such that the seat back 14 faces forward. The width direction of the automobile seat 12 thus agrees with the automobile width direction.

The internal structure of a side portion of the seat back 14 on the outer side will now be described.

Figure 4:
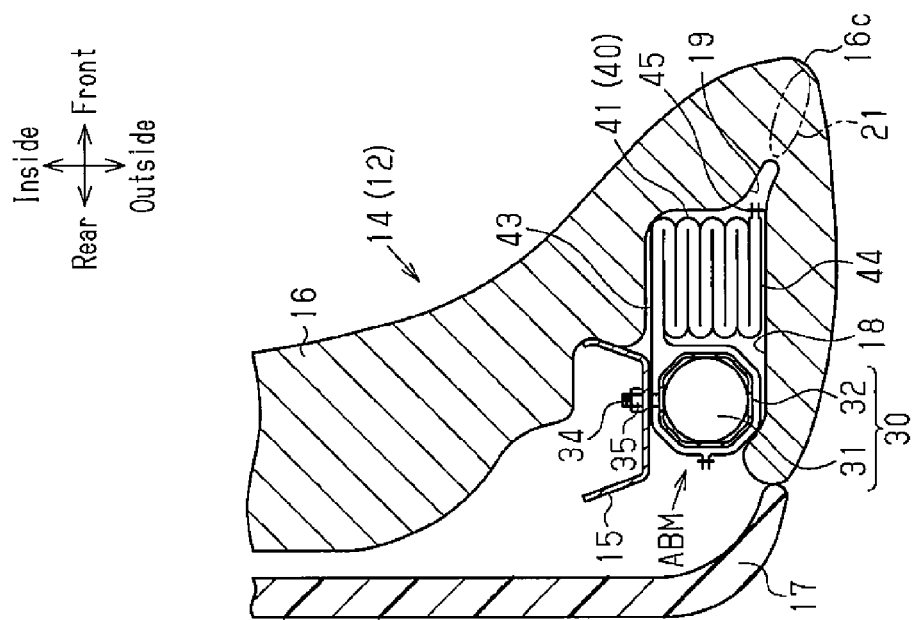
FIG. 4 is a cross-sectional plan view partially showing the internal structure of a side portion of the seat back in which an airbag module is installed in the embodiment.

The seat back 14 incorporates a seat frame, which forms the framework. A part of the seat frame forms a side frame portion 15, which is located in the outer-side portion of the seat back 14 as shown in FIG. 4. The side frame portion 15 is formed by bending a metal plate. A seat pad 16, which is made of an elastic material such as urethane foam, is provided on the front side of the seat frame, which includes the side frame portion 15. Also, a hard back board 17, which is formed, for example, of plastic, is arranged on the back of the seat frame. Although the seat pad 16 is coated with a cover, the cover is not illustrated in FIG. 4.

In the seat pad 16, a storage portion 18 is provided in the vicinity of the outer side of the side frame portion 15. The storage portion 18 accommodates an airbag module ABM, which forms a main part of the side airbag apparatus.

A slit 19 is formed to extend from a corner of the storage portion 18. The slit 19 extends diagonally forward and toward the outer side. The location between a front corner 16c of the seat pad 16 and the slit 19 (the location surrounded by the long dashed double-short dashed line in FIG. 4) forms a breakable portion 21, which is designed to be broken by an airbag 40, which will be discussed below.

The airbag module ABM includes as its main components a gas generator 30 and the airbag 40. These components will now be described.

<Gas Generator 30>

Figure 14:
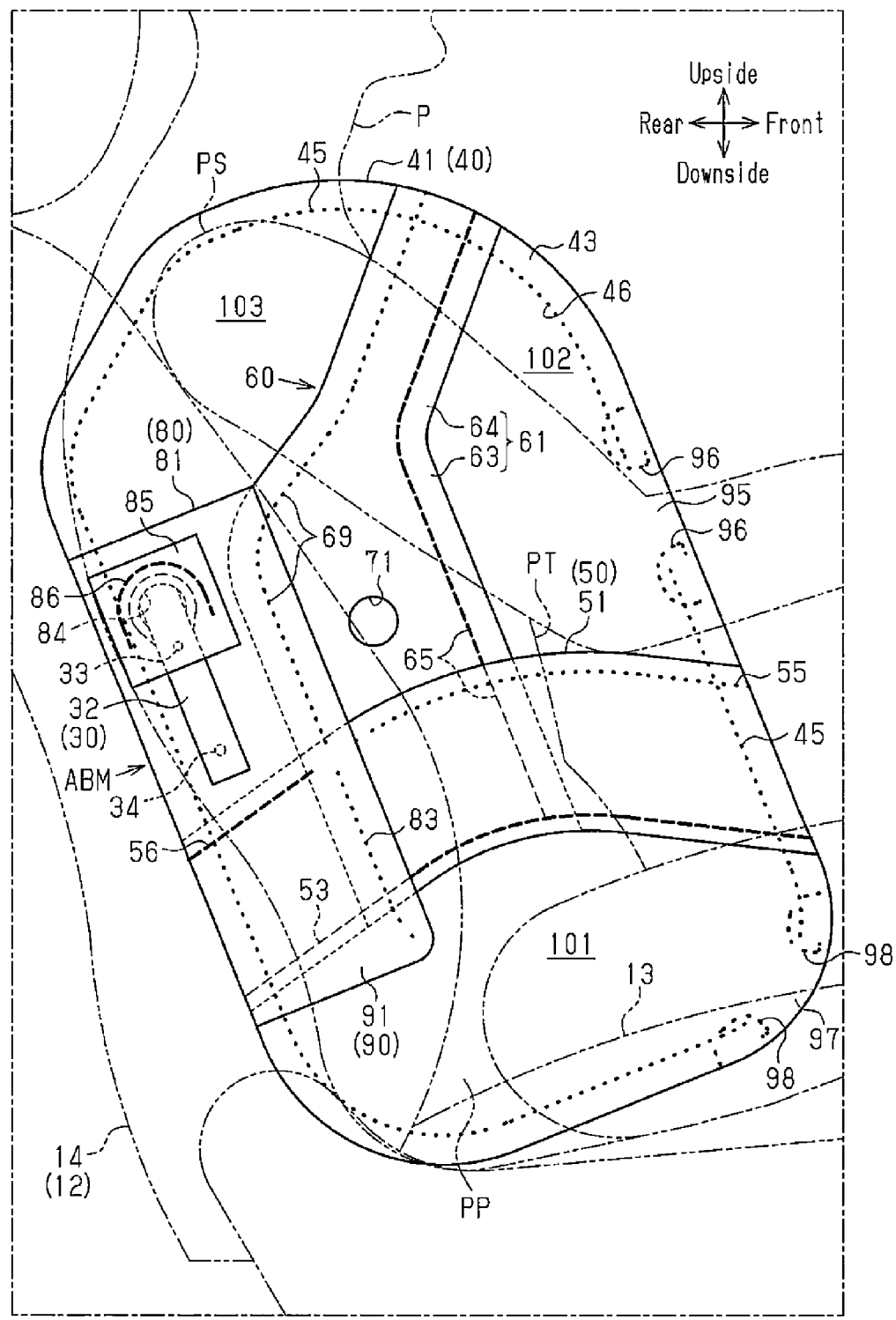
FIG. 14 is a cross-sectional side view illustrating, together with an occupant and an automobile seat, the internal structure of the airbag module of FIG. 5.

As shown in FIGS. 4 and 14, the gas generator 30 includes an inflator 31 and a retainer 32, which surrounds the inflator 31. A pyrotechnic type inflator is employed as the inflator 31. The inflator 31 is substantially columnar and accommodates a gas generating agent (not shown), which generates inflation gas. The inflator 31 has a gas outlet (not shown) at the lower end. A harness (not shown) for inputting activation signals to the inflator 31 is connected to the upper end of the inflator 31.

In place of the pyrotechnic type inflator using the gas generating agent, it is possible to use a hybrid type inflator, which discharges inflation gas by breaking a partition wall of a high-pressure gas cylinder filled with high-pressure gas with a low explosive.

The retainer 32 functions as a diffuser for controlling the direction of discharged inflation gas and also serves to fasten the inflator 31, together with the airbag 40, to the side frame portion 15. Most of the retainer 32 is formed by bending a plate such as a metal plate into a cylindrical shape. A pair of bolts 33, 34 is fixed to the retainer 32. The bolts 33, 34 serve as securing members for attaching the retainer 32 to the side frame portion 15. The gas generator 30 may be configured by integrating the inflator 31 and the retainer 32.

As shown in FIGS. 1 to 3, the outer envelope of the airbag 40 is formed by an airbag main body 41.

<Airbag Main Body 41>

Figure 5:
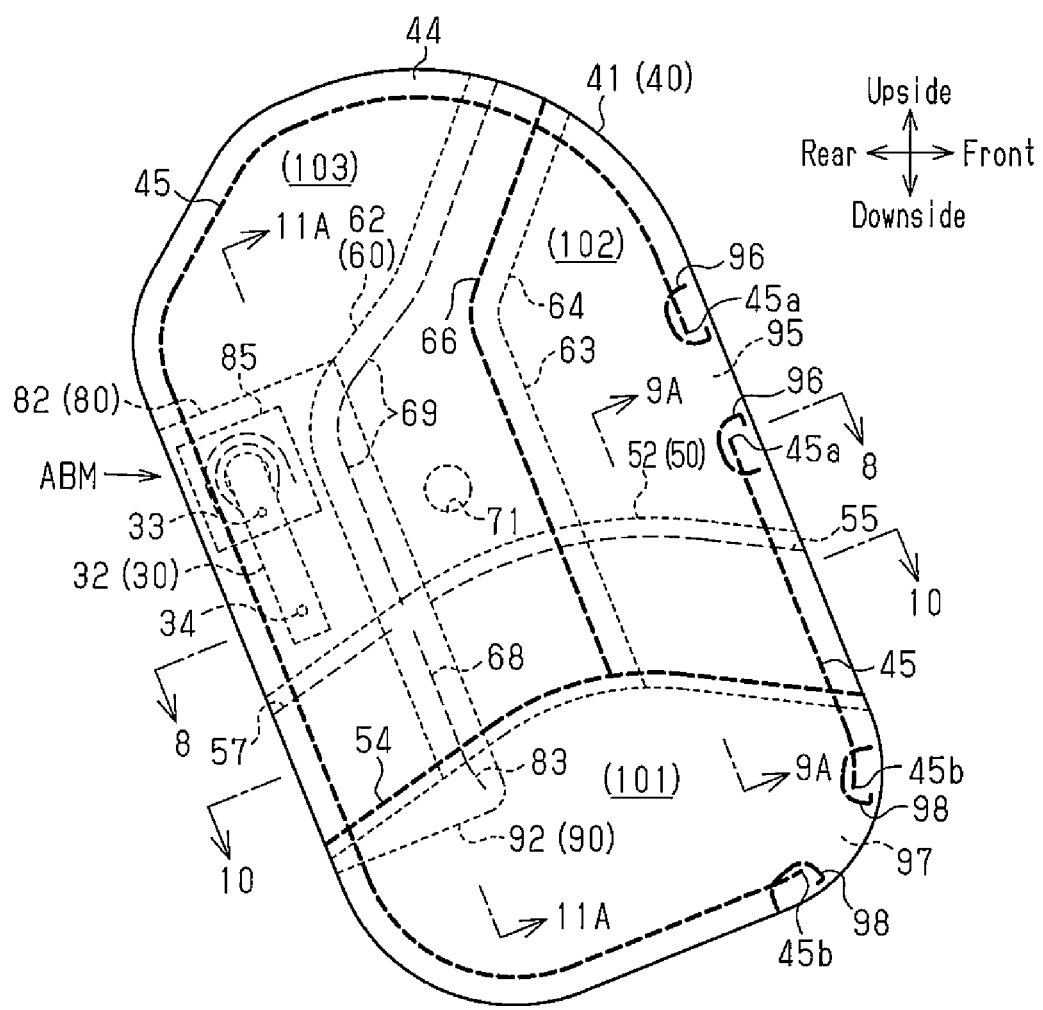
FIG. 5 is a side view illustrating the airbag module, as viewed from the outer side of the automobile, with an airbag main body in an uninflated and spread state in the embodiment.
Figure 12:
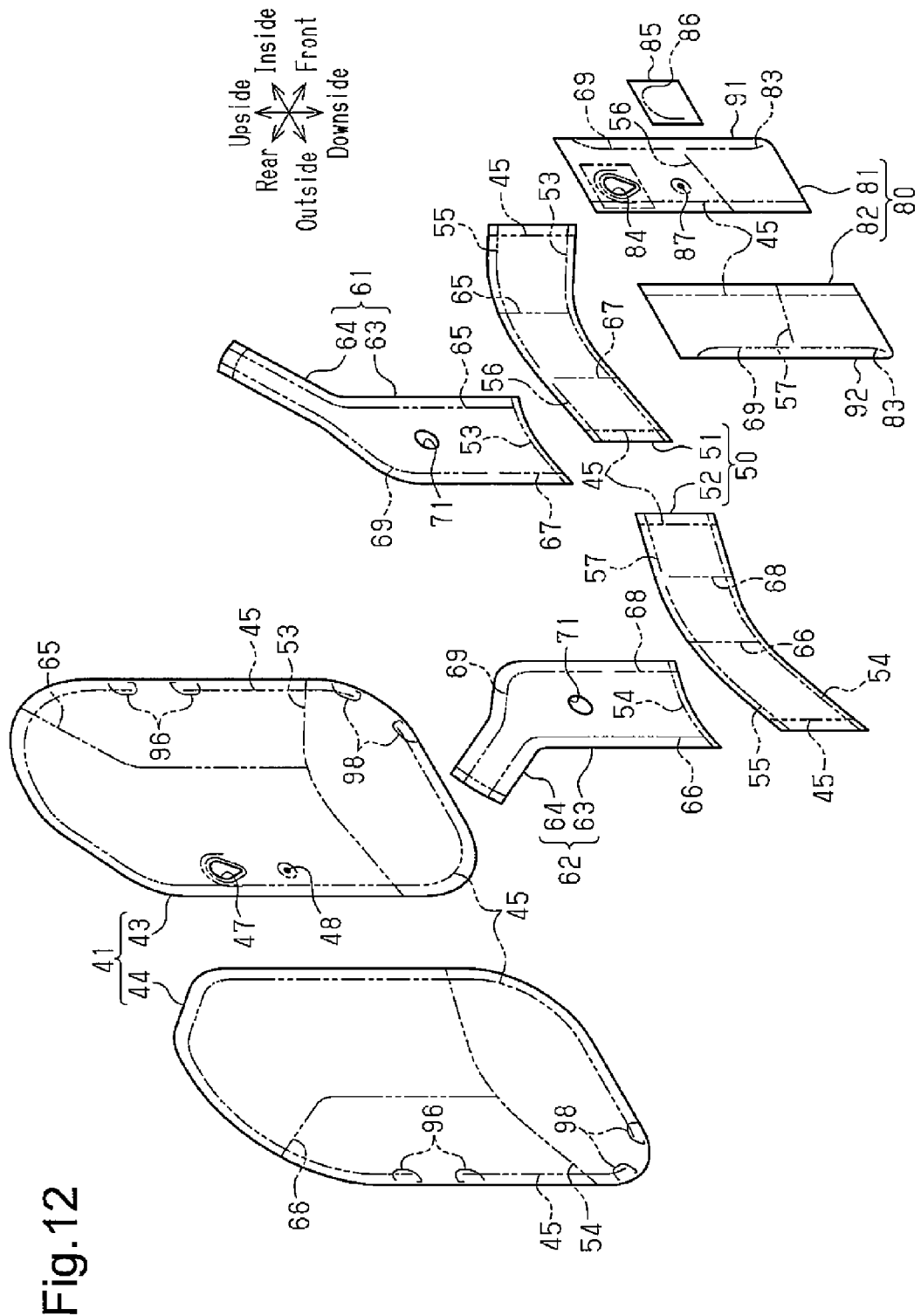
FIG. 12 is an exploded perspective view showing a spread state of the components of the airbag in the embodiment.

FIG. 5 shows the airbag module ABM in a state in which the airbag main body 41 is deployed in a planar form without being filled with inflation gas (hereinafter, referred to as an uninflated and spread state). FIG. 12 shows the components of the airbag 40 including the airbag main body 41 in a deployed state. FIG. 14 shows, together with the automobile seat 12 and an occupant P, the airbag module ABM, in which the airbag main body 41 of FIG. 5 is separated at the center portion in the automobile width direction to show the internal structure of the airbag module ABM.

As shown in FIGS. 5, 12, and 14, the airbag main body 41 has main body fabric portions 43, 44, which are overlaid on each other in the automobile width direction. The shape and the size of the main body fabric portions 43, 44 are set such that the airbag main body 41 occupies the region corresponding to most part of the upper body of the occupant P (the area including the lumbar region PP and the shoulder region PS) when the airbag main body 41 is deployed and inflated between the automobile seat 12 and the body side portion 11.

The main body fabric portions 43, 44 are preferably formed of a material that is strong and flexible to facilitate folding. The material may be, for example, woven cloth formed of polyester threads or polyamide threads.

The main body fabric portions 43, 44 are joined to each other at a peripheral joint portion 45 provided along the peripheries. In the present embodiment, the peripheral joint portion 45 is formed by sewing the peripheries of the main body fabric portions 43, 44 with sewing threads. This configuration applies to various types of joint portions, which will be discussed below. Various types of joint portions include first lateral joint portions 56, 57, second lateral joint portions 53, 54, a third lateral joint portion 55, a first vertical joint portion 69, a second vertical joint portion 83, third vertical joint portions 65, 66, fourth vertical joint portions 67, 68, and surrounding joint portions 96, 98.

In FIGS. 5 to 7B, 13 and 14, sewn portions are indicated by first to third broken lines. The first broken line includes thick line segments of a certain length arranged intermittently and represents sewing threads as viewed from the side (refer to the peripheral joint portion 45 in FIG. 5). The second broken line includes thin line segments of a certain length (longer than that of a typical broken line) arranged intermittently and represents the state of sewing threads that are located, for example, behind a fabric piece and cannot be seen directly (refer to the first vertical joint portion 69 in FIG. 5). The third broken line includes dots arranged at predetermined intervals and represents the cross-section of the sewing threads extending along a plane that passes through the sewn portions (refer to the first vertical joint portion 69 in FIG. 13).

The peripheral joint portion 45 may be formed by a method other than sewing using sewing threads. For example, the peripheral joint portion 45 may be formed by adhesion with an adhesive. Such modification is applicable to any of the above described joint portions.

As shown in FIGS. 6, 7A, and 7B, the inner-side main body fabric portion 43 has a first insertion port 47 for inserting the gas generator 30 at the upper part of the rear end. The main body fabric portion 43 also has a first bolt hole 48 for inserting the lower bolt 34 of the gas generator 30 at a position substantially below the first insertion port 47.

As shown in FIGS. 5 and 14, the space between the main body fabric portions 43, 44 surrounded by the peripheral joint portion 45 serves as an inflation portion 46, which is deployed and inflated with inflation gas. A lateral partition 50, a vertical partition 60, which has communication portions 71, and an inner tube 80, which has a check valve 90 at the lower part, are provided in the inflation portion 46. The lateral partition 50 and the vertical partition 60 each have the same structure as a member generally referred to as a tether.

<Lateral Partition 50>

As shown in FIGS. 5, 12, and 14, the lateral partition 50 divides the inflation portion 46 into a lower inflation chamber 101 and an upper inflation chamber above the lower inflation chamber 101 and is formed by a pair of third fabric portions 51, 52, which is made of the same material as that of the airbag main body 41. When the airbag main body 41 is in the uninflated and spread state, the third fabric portions 51, 52 are overlaid on each other with respect to the automobile width direction. In this state, the third fabric portions 51, 52 are curved such that the middle portions in the front-rear direction protrude upward.

The inner-side third fabric portion 51 has a second lateral joint portion 53, which extends substantially in the front-rear direction and along the lower periphery, and is joined to the inner-side main body fabric portion 43 by the second lateral joint portion 53. Likewise, the outer-side third fabric portion 52 has a second lateral joint portion 54, which extends substantially in the front-rear direction and along the lower periphery, and is joined to the outer-side main body fabric portion 44 by the second lateral joint portion 54.

Figure 9A:
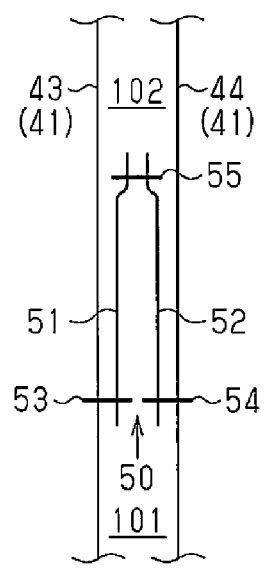
FIG. 9A is a cross-sectional view taken along line 9A-9A in FIG. 5.

At the locations that do not overlap the inner tube 80, the third fabric portions 51, 52 are joined to each other by the third lateral joint portion 55, which is provided on the upper peripheries and extends substantially in the front-rear direction (see FIG. 9A). At the locations that overlap the inner tube 80, the inner-side third fabric portion 51 is joined to an inner-side second fabric portion 81 of the inner tube 80 by the inner-side first lateral joint portion 56, which extends substantially in the front-rear direction and along the upper periphery of the third fabric portion 51. At the locations that overlap the inner tube 80, the outer-side third fabric portion 52 is joined to an outer-side second fabric portion 82 of the inner tube 80 by the outer-side first lateral joint portion 57, which extends substantially in the front-rear direction and along the upper periphery of the third fabric portion 52 (see FIG. 11A).

Figure 10:
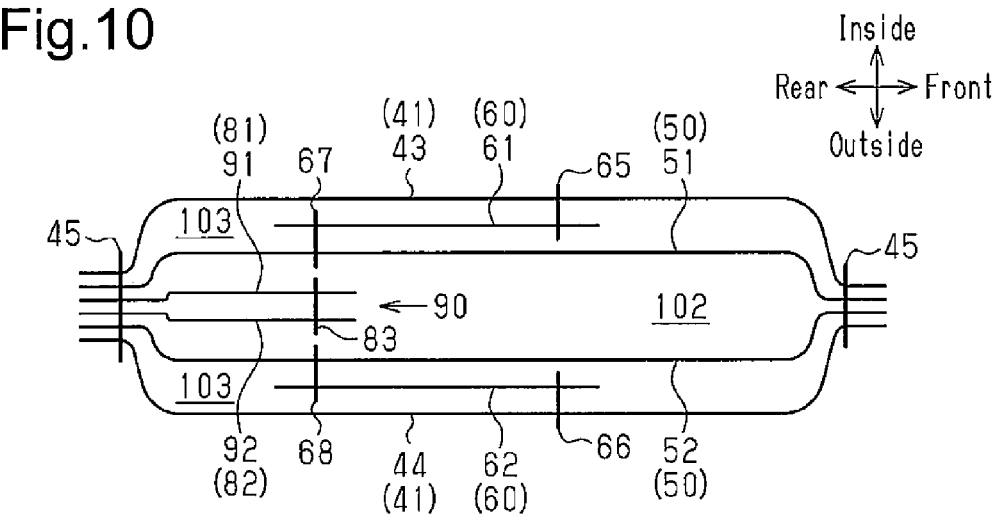
FIG. 10 is a cross-sectional view taken along line 10-10 of FIG. 5.

As shown in FIG. 10, the front ends of the third fabric portions 51, 52 are joined to the front ends of the main body fabric portions 43, 44 by a part of the peripheral joint portion 45. Likewise, the rear ends of the third fabric portions 51, 52 are joined to the rear ends of the main body fabric portions 43, 44 by a part of the peripheral joint portion 45. The lateral partition 50 bridges between the main body fabric portions 43, 44 by the above described joining structure.

A space of the inflation portion 46 below the lateral partition 50 forms the lower inflation chamber 101, which is deployed and inflated beside the lumbar region PP, which is a part of the upper body of the occupant P.

<Vertical Partition 60>

As shown in FIGS. 5 and 12, the vertical partition 60 divides the upper inflation chamber into an upper-rear inflation chamber 103 and an upper-front inflation chamber 102 located on the front side of the upper-rear inflation chamber 103. The vertical partition 60 is formed by a pair of first fabric portions 61, 62, which is made of the same material as that of the airbag main body 41. When the airbag main body 41 is in the uninflated and spread state, the first fabric portions 61, 62 are overlaid on each other with respect to the automobile width direction. In this state, each of the first fabric portions 61, 62 is formed by a base fabric portion 63 and an inclined fabric portion 64 located above the base fabric portion 63. Each base fabric portion 63 forms a central portion and a lower portion of each of the first fabric portions 61, 62. The inclined fabric portion 64 extends forward and upward from the upper end of the base fabric portion 63 and is inclined forward toward the upper end. As shown in FIG. 5, the upper parts of the front ends of the inclined fabric portions 64 are joined to the upper parts of the front ends of the main body fabric portions 43, 44 by a part of the peripheral joint portion 45.

As shown in FIG. 10, the lower part of the inner-side first fabric portion 61 is located between the inner-side main body fabric portion 43 of the airbag main body 41 and the middle portion of the inner-side third fabric portion 51 of the lateral partition 50 with respect to the front-rear direction. As shown in FIG. 6, the lower end of the inner-side first fabric portion 61 is joined to the inner-side main body fabric portion 43 and the lower end of the inner-side third fabric portion 51 by a part of the inner-side second lateral joint portion 53.

As shown in FIG. 10, the lower part of the outer-side first fabric portion 62 is located between the outer-side main body fabric portion 44 of the airbag main body 41 and the middle portion of the outer-side third fabric portion 52 of the lateral partition 50 with respect to the front-rear direction. As shown in FIG. 5, the lower end of the outer-side first fabric portion 62 is joined to the outer-side main body fabric portion 44 and the lower end of the outer-side third fabric portion 52 by a part of the outer-side second lateral joint portion 54.

As shown in FIGS. 6 and 10, the inner-side first fabric portion 61 is joined to the inner-side main body fabric portion 43 by the inner-side third vertical joint portion 65, which extends substantially vertically along the front periphery of the first fabric portion 61. As shown in FIGS. 5 and 10, the outer-side first fabric portion 62 is joined to the outer-side main body fabric portion 44 by the outer-side third vertical joint portion 66, which extends substantially vertically along the front periphery of the first fabric portion 62.

As shown in FIG. 10, at a location overlapping the lateral partition 50, the inner-side first fabric portion 61 of the vertical partition 60 is joined to the inner-side third fabric portion 51 of the lateral partition 50 by the inner-side fourth vertical joint portion 67, which extends substantially vertically along the rear periphery of the first fabric portion 61. Likewise, at a location overlapping the lateral partition 50, the outer-side first fabric portion 62 of the vertical partition 60 is joined to the outer-side third fabric portion 52 of the lateral partition 50 by the outer-side fourth vertical joint portion 68, which extends substantially vertically along the rear periphery of the first fabric portion 62.

Figure 8:
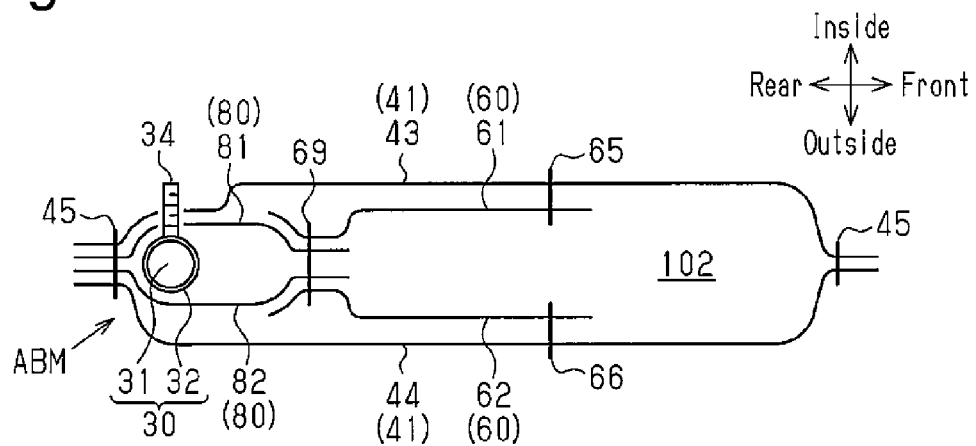
FIG. 8 is a cross-sectional view taken along line 8-8 of FIG. 5.

As shown in FIGS. 5, 6, and 8, at a location not overlapping the lateral partition 50, the first fabric portions 61, 62 of the vertical partition 60 are joined to each other by the first vertical joint portion 69, which extends substantially vertically along the rear peripheries of the first fabric portions 61, 62. The vertical partition 60 bridges between the main body fabric portions 43, 44 by the above described joining structure.

As shown in FIG. 5, the space in the upper inflation chamber that is rearward of the vertical partition 60 forms an upper-rear inflation chamber 103. The gas generator 30 is located at the rear end of the upper-rear inflation chamber 103. The details will be discussed below. The upper-rear inflation chamber 103 is supplied with inflation gas directly from the inflator 31 to be deployed and inflated beside the rear half of the thorax region PT and the shoulder region PS in the upper body of the occupant P. The part of the upper-rear inflation chamber 103 that is inflated beside the shoulder region PS of the occupant P is located rearward of the inclined fabric portions 64.

A part of the upper inflation chamber that is forward of the vertical partition 60 forms an upper-front inflation chamber 102. The upper-front inflation chamber 102 is supplied with inflation gas delivered via the upper-rear inflation chamber 103 and the vertical partition 60 and is deployed and inflated beside the front half of the thorax region PT in the upper body of the occupant P. The upper-rear inflation chamber 103 and the upper-front inflation chamber 102 are arranged in the front-rear direction with the vertical partition 60 in between.

The vertical partition 60 has the communication portions 71, which connect the upper-rear inflation chamber 103 and the upper-front inflation chamber 102 with each other. In the present embodiment, the communication portions 71 are formed by circular holes formed in the first fabric portions 61, 62 in the vertical partition 60.

Each of the first fabric portions 61, 62 may have two or more communication portions 71. Alternatively, only one of the first fabric portions 61, 62 may have a communication portion 71.

<Inner Tube 80>

The inner tube 80 is arranged at the rear end in the airbag main body 41 in the uninflated and spread state and encompasses most of the gas generator 30 except for the upper end. The inner tube 80 has a function of regulating the flow of inflation gas from the gas outlet of the gas generator 30 toward the lower inflation chamber 101 and the upper-rear inflation chamber 103. In the present embodiment, the inner tube 80 delivers a greater amount of inflation gas from the gas outlet to the lower inflation chamber 101 than to the upper-rear inflation chamber 103. That is, the inner tube 80 is configured such that the inflation gas is preferentially delivered to the lower inflation chamber 101 over the upper-rear inflation chamber 103.

Figure 13:
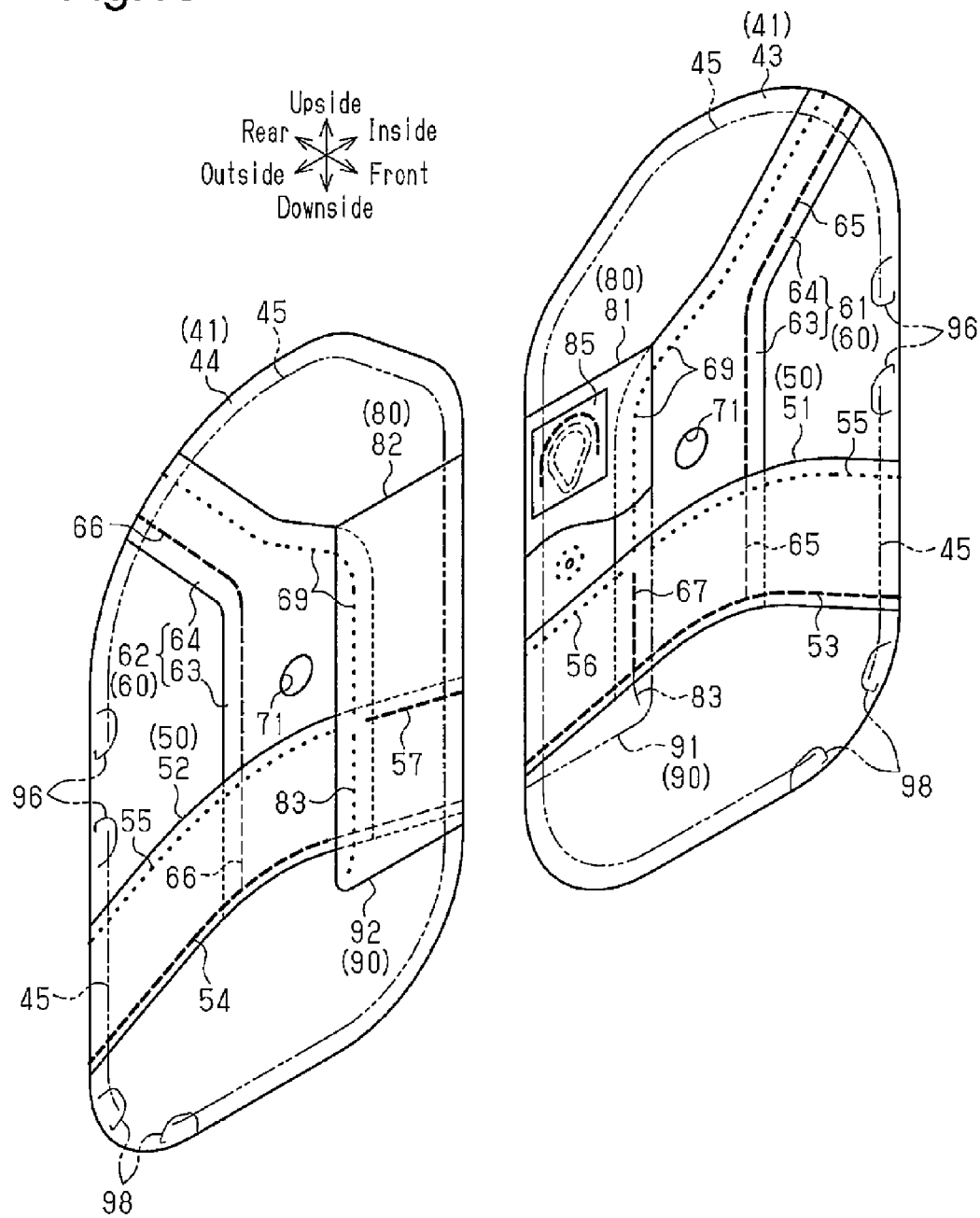
FIG. 13 is a perspective view showing the airbag being spread and separated at the center in the automobile width direction in the embodiment.

As shown in FIG. 13, the inner tube 80 is formed by the second fabric portions 81, 82, which are made of the same material as that of the airbag main body 41. The second fabric portions 81, 82 each have a vertically extending rectangular shape. When the airbag main body 41 is in the uninflated and spread state, the second fabric portions 81, 82 are overlaid on each other with respect to the automobile width direction and located between the rear parts of the third fabric portions 51, 52 of the lateral partition 50.

As shown in FIG. 8, the rear ends of the second fabric portions 81, 82 are joined to the rear ends of the main body fabric portions 43, 44 by a part of the peripheral joint portion 45.

At the locations of the second fabric portions 81, 82 that do not overlap the lateral partition 50, the upper parts of the front ends of the second fabric portions 81, 82 are joined to the rear ends of the first fabric portions 61, 62 of the vertical partition 60 by a part of the first vertical joint portion 69. As shown in FIGS. 5 and 10, at the locations of the second fabric portions 81, 82 that overlap the lateral partition 50, the front ends of the second fabric portions 81, 82 are joined to each other by the second vertical joint portion 83, which extends substantially vertically.

The space between the upper ends of the second fabric portions 81, 82 and the space between lower ends of the second fabric portions 81, 82 are both open. The inner tube 80 is thus formed as a vertically extending tube with openings at the upper and lower ends.

As shown in FIGS. 12 and 14, the inner-side second fabric portion 81 has a second insertion port 84 for inserting the gas generator 30 at a location that corresponds to the first insertion port 47 in the inner-side main body fabric portion 43. A lid sheet 85 is arranged between the upper parts of the second fabric portions 81, 82. The lid sheet 85 is made of the same material as that of the main body fabric portions 43, 44 and closes the first and second insertion ports 47, 84. As shown in FIG. 14, the lid sheet 85 is joined to the inner-side main body fabric portion 43 and the inner-side second fabric portion 81 by a substantially semicircular joint portion 86 provided along the upper parts of the first and second insertion ports 47, 84. As shown in FIG. 12, a second bolt hole 87 for inserting the lower bolt 34 of the gas generator 30 is formed at a position below the second insertion port 84 in the inner-side second fabric portion 81.

Being held in a substantially vertically extending position, most of the gas generator 30, except for the upper end, is inserted into the space between the inner-side second fabric portion 81 and the lid sheet 85 through the first insertion port 47 of the inner-side main body fabric portion 43 and the second insertion port 84 of the inner-side second fabric portion 81. The gas outlet of the gas generator 30 is located between the second fabric portions 81, 82 of the inner tube 80. The upper portion of the gas generator 30 is exposed to the outside of the airbag main body 41. The upper bolt 33 of the gas generator 30 is exposed to the outside of the airbag main body 41 via the second insertion port 84 and the first insertion port 47. The lower bolt 34 of the gas generator 30 is inserted into the second bolt hole 87 and the first bolt hole 48, so that the gas generator 30 is secured while being positioned in relation to the inner tube 80 and the airbag main body 41.

The check valve 90 controls the flow of inflation gas through the inner tube 80. The check valve 90 allows inflation gas to flow from the upper-rear inflation chamber 103 to the lower inflation chamber 101, but restricts the flow in the opposite direction, or the flow of inflation gas from the lower inflation chamber 101 to the upper-rear inflation chamber 103.

Figure 11A:
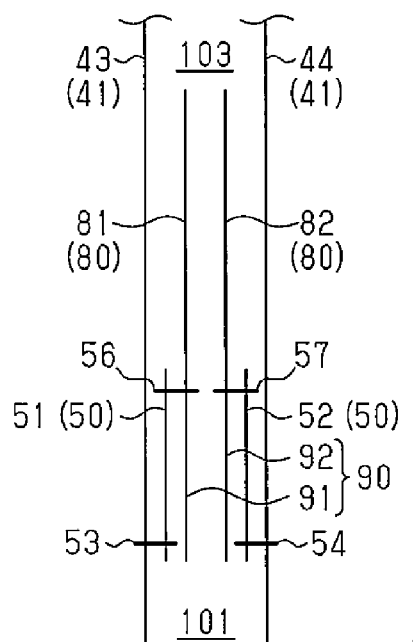
FIG. 11A is a cross-sectional view taken along line 11A-11A in FIG. 5.

As shown in FIG. 11A, the lower part of the inner-side second fabric portion 81 in the inner tube 80 configures an inner-side valve member 91, and the lower part of the outer-side second fabric portion 82 configures an outer-side valve member 92. The upper end of the inner-side valve member 91 is joined to the rear part of the upper end of the inner-side third fabric portion 51 in the lateral partition 50 by the inner-side first lateral joint portion 56. The upper end of the outer-side valve member 92 is joined to the rear part of the upper end of the outer-side third fabric portion 52 in the lateral partition 50 by the outer-side first lateral joint portion 57.

As shown in FIG. 10, the rear ends of the valve members 91, 92 are joined to the rear ends of the main body fabric portions 43, 44 in the airbag main body 41 by a part of the peripheral joint portion 45. The front ends of the valve members 91, 92 are joined to each other by the second vertical joint portion 83.

Figure 11B:
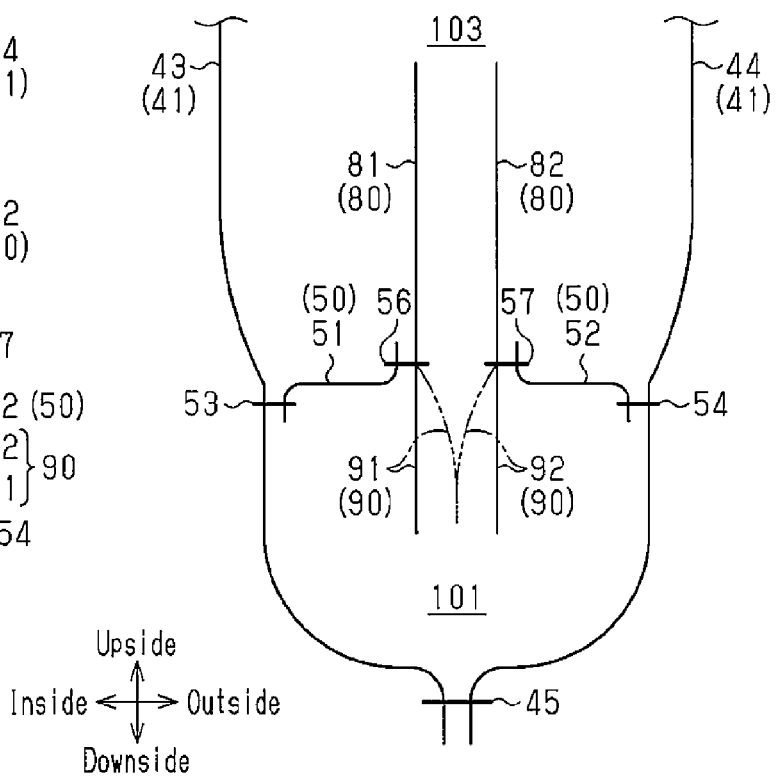
FIG. 11B is a partial cross-sectional view showing a state of the interior of the airbag lower portion when the lateral partition is strained from the state shown in FIG. 11A.

As indicated by solid lines in FIG. 11B, the check valve 90 allows flow of inflation gas when one of the valve members 91, 92 is separated from the other. This state of the check valve 90 is referred to as a valve opened state. Also, as indicated by long dashed double-short dashed lines in FIG. 11B, the check valve 90 restricts flow of inflation gas when the valve members 91, 92 contact each other in at least parts thereof. This state of the check valve 90 is referred to as a valve closed state.

As shown in FIGS. 5, 12 and 14, the airbag main body 41 has vent holes 95, 97 for venting inflation gas.

<Vent Holes 95, 97>

The main body fabric portions 43, 44 are not joined to each other at the front end of the upper-front inflation chamber 102. That is, the peripheral joint portion 45 has two first end portions 45a, which are separate from each other, at the front end of the upper-front inflation chamber 102. The airbag main body 41 has two first surrounding joint portions 96, each of which joins the main body fabric portions 43, 44 to each other while surrounding the corresponding first end portion 45a. The area that is between the main body fabric portions 43, 44 and between the first surrounding joint portions 96 does not function to join the peripheral portions of the main body fabric portions 43, 44 to each other, but forms the first vent hole 95, which connects the inside and the outside of the upper-front inflation chamber 102 to each other. The inflation gas in the upper-front inflation chamber 102 is discharged to the outside through the first vent hole 95.

The main body fabric portions 43, 44 are not joined to each other at the front lower parts of the lower inflation chamber 101. That is, the peripheral joint portion 45 has two second end portions 45b, which are separate from each other, at the front lower part of the lower inflation chamber 101. The airbag main body 41 has two second surrounding joint portions 98, each of which joins the main body fabric portions 43, 44 to each other while surrounding the corresponding second end portion 45b. The area that is between the main body fabric portions 43, 44 and between the second surrounding joint portions 98 forms the second vent hole 97, which connects the inside and the outside of the lower inflation chamber 101 to each other. The inflation gas in the lower inflation chamber 101 is discharged to the outside through the second vent hole 97.

As shown in FIG. 4, the airbag module ABM includes as its main components the gas generator 30 and the airbag 40. The airbag module ABM is made compact (hereinafter, referred to as a storage form) by folding the airbag 40 in the uninflated and spread state (see FIGS. 5 and 6). The airbag module ABM in the storage form is stored in the storage portion 18. The bolts 33, 34, which extend from the gas generator 30 and through the inner-side second fabric portion 81 of the inner tube 80 and the inner-side main body fabric portion 43 of the airbag main body 41 are inserted into the side frame portion 15 from the outer side. Nuts 35 are threaded to the bolts 33, 34, which are passed though the side frame portion 15, from the inner side, so that the gas generator 30 is fixed to the side frame portion 15 together with the rear end of the airbag main body 41 and the inner tube 80.

The gas generator 30 may be fixed to the side frame portion 15 using members other than the bolts 33, 34 and the nuts 35.

As shown in FIG. 1, the side airbag apparatus includes an impact sensor 111 and a controller 112 in addition to the airbag module ABM. The impact sensor 111 includes an acceleration sensor and is provided on the body side portion 11 of the automobile 10 (see FIG. 2) to detect an impact applied from the side of the body side portion 11. The controller 112 controls the operation of the gas generator 30 based on a detection signal from the impact sensor 111.

The automobile 10 is equipped with a seat belt apparatus for restraining the occupant P seated in the automobile seat 12. However, illustration of the seat belt apparatus is omitted, for example, in FIG. 1.

Operation of the side airbag apparatus according to the above-described embodiment will now be described.

When the airbag 40 is manufactured, the lateral partition 50, the vertical partition 60, and the inner tube 80 are arranged in the airbag main body 41 as shown in FIG. 14. To divide, with these three members, the interior of the airbag main body 41 into the lower inflation chamber 101, the upper-rear inflation chamber 103, and the upper-front inflation chamber 102, each member needs to be joined to the other two members and to the airbag main body 41.

To join the vertical partition 60 to the inner tube 80, as shown in FIG. 13, the vertical partition 60 is configured by the first fabric portions 61, 62 arranged in the automobile width direction, and the inner tube 80 is configured by the second fabric portions 81, 82 arranged in the automobile width direction. In FIG. 13, a part of the second fabric portion 81 is shown with a part cut away. As shown in FIGS. 5 and 8, the rear ends of the first fabric portions 61, 62 of the vertical partition 60 and the front ends of parts of the second fabric portions 81, 82 of the inner tube 80 above the check valve 90 (the upper parts of the front ends) are joined together by the first vertical joint portion 69, which extends substantially vertically.

At the joining operation using the first vertical joint portion 69, the upper parts of the front ends of the second fabric portions 81, 82 of the inner tube 80 and the rear ends of the first fabric portions 61, 62 of the vertical partition 60 are locations to be joined. That is, the upper parts of the front ends of the second fabric portions 81, 82 and the rear ends of the first fabric portions 61, 62 serve as marks to join the inner tube 80 and the vertical partition 60. In this manner, the location at which the first vertical joint portion 69 is formed is easily determined. That is, the first vertical joint portion 69 is easily positioned. The upper parts of the front ends of the second fabric portions 81, 82 of the inner tube 80 are arranged between the rear ends of the first fabric portions 61, 62 of the vertical partition 60 and overlaid on the rear ends. In other words, the rear ends of the first fabric portions 61, 62 of the vertical partition 60 and the upper parts of the front ends of the second fabric portions 81, 82 of the inner tube 80 are brought close to each other.

The upper parts of the front ends of the second fabric portions 81, 82 and the rear ends of the first fabric portions 61, 62 of the vertical partition 60 are overlaid on each other to form a belt-shaped portion. The first vertical joint portion 69 is partly provided on that belt-shaped portion to extend substantially vertically. As a result, the upper parts of the front ends of the second fabric portions 81, 82 of the inner tube 80 and the rear ends of the first fabric portions 61, 62 of the vertical partition 60 are joined to each other by a part of the first vertical joint portion 69.

In the check valve 90 at the lower part of the inner tube 80, the front end of the inner-side second fabric portion 81 and the front end of the outer-side second fabric portion 82 are joined to each other by the second vertical joint portion 83, which extends substantially vertically (see FIG. 10). The first fabric portions 61, 62 of the vertical partition 60 are not joined to the parts of the second fabric portions 81, 82 that form the check valve 90 and are below the first lateral joint portion 56, 57.

To be joined to the inner tube 80, the lateral partition 50 has the third fabric portions 51, 52, which are arranged in the automobile width direction (see FIG. 11A).

The rear part of the upper end of the inner-side third fabric portion 51 is joined to the upper end of the valve member 91 of the inner-side second fabric portion 81 by the first lateral joint portion 56, which extends substantially in the front-rear direction. Also, the rear part of the upper end of the outer-side third fabric portion 52 is joined to the upper end of the valve member 92 of the outer-side second fabric portion 82 by the first lateral joint portion 57, which extends substantially in the front-rear direction.

Further, to join the lateral partition 50 to the vertical partition 60, the middle sections in the front-rear direction of the third fabric portions 51, 52 of the lateral partition 50 are arranged between and overlaid on the lower parts of the first fabric portions 61, 62 of the vertical partition 60 (see FIGS. 5 and 10). The lower end of the inner-side first fabric portion 61 of the vertical partition 60 is joined to the lower end of the middle section of the inner-side third fabric portion 51 of the lateral partition 50 by a part of the inner-side second lateral joint portion 53, which extends substantially in the front-rear direction (see FIG. 6). Also, the lower end of the outer-side first fabric portion 62 of the vertical partition 60 is joined to the lower end of the middle section of the outer-side third fabric portion 52 of the lateral partition 50 by a part of the outer-side second lateral joint portion 54, which extends substantially in the front-rear direction (see FIG. 5).

In this manner, any two adjacent ones of the lateral partition 50, the vertical partition 60, and the inner tube 80 are joined to each other.

According to the above described side airbag apparatus of the present embodiment, when the impact sensor 111 does not detect any impact from the side of the body side portion 11, the controller 112 does not output to the gas generator 30 an activation signal for activating the inflator 31. Thus, the gas generator 30 does not discharge inflation gas. As shown in FIG. 4, the airbag main body 41 remains stored in the storage portion 18 in the storage form.

When the impact sensor 111 detects that an impact of a magnitude greater than or equal to a predetermined value has been applied to the body side portion 11 due to a side collision or the like while the automobile 10 is moving, the controller 112, based on the detection signal, outputs an activation signal for activating the gas generator 30 to the gas generator 30. In response to the activation signal, the inflator 31 discharges inflation gas through the gas outlet. The discharged gas is divided into gas flowing upward and gas flowing downward by the inner tube 80. The amount of the inflation gas flowing downward is greater than the amount of the inflation gas flowing upward. The inflation gas that has been delivered upward is supplied to the upper-rear inflation chamber 103 from the upper end of the inner tube 80. The inflation gas thus increases the internal pressure of the upper-rear inflation chamber 103, so that the upper-rear inflation chamber 103 starts being inflated.

The inflation gas that has been delivered downward is supplied to the check valve 90 from the lower end of the inner tube 80. During the period in which inflation gas is being supplied to the check valve 90, a force that deforms the valve members 91, 92 into a tubular shape is generated. This force opens the check valve 90 as illustrated by the solid lines in FIG. 11B. Thus, the inflation gas passes between the valve members 91, 92 and flows into the lower inflation chamber 101. The inflation gas thus increases the internal pressure of the lower inflation chamber 101, so that the lower inflation chamber 101 starts being inflated.

Figure 9B:
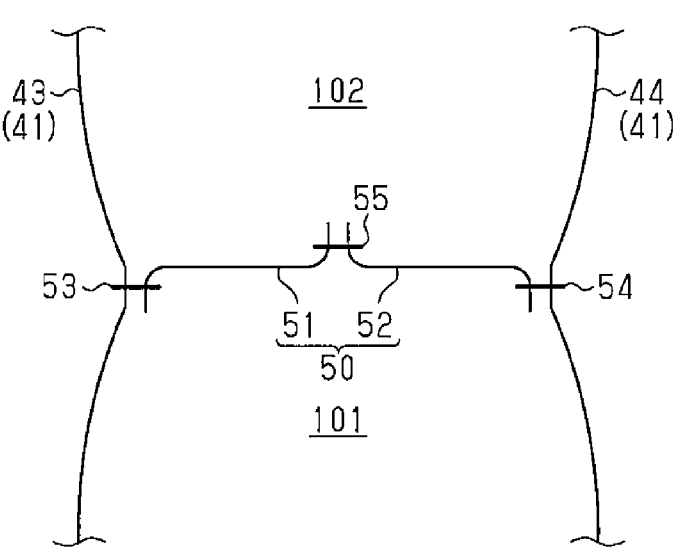
FIG. 9B is a partial cross-sectional view showing a state of the interior of the airbag lower portion when the lateral partition is strained from the state shown in FIG. 9A.
Figure 15:
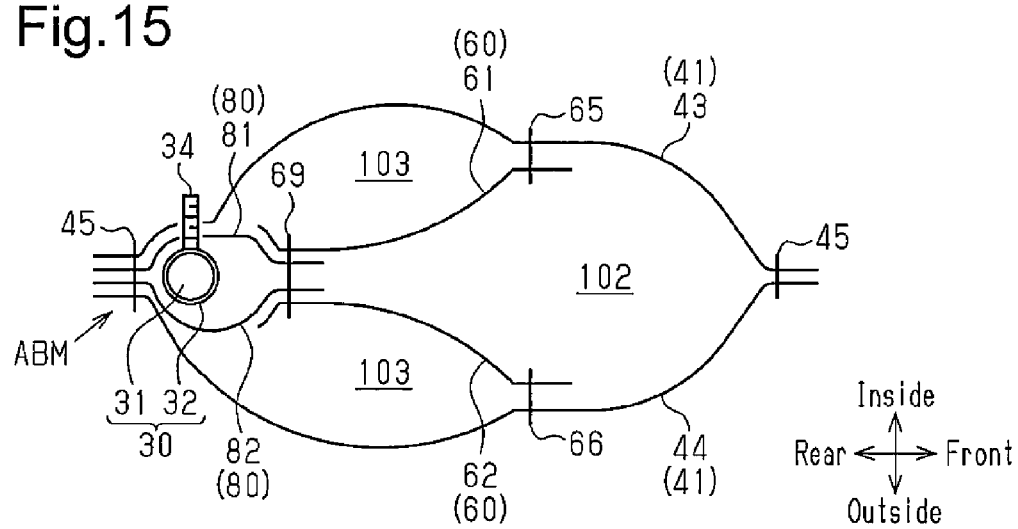
FIG. 15 is a cross-sectional plan view corresponding to FIG. 8, illustrating a state in which the airbag main body is deployed and inflated.

Continuous supply of the inflation gas from the gas generator 30 increases the internal pressures of the upper-rear inflation chamber 103 and the lower inflation chamber 101. Since the lower inflation chamber 101 receives a greater amount of inflation gas than the upper-rear inflation chamber 103, the internal pressure of the lower inflation chamber 101 becomes higher than that of the upper-rear inflation chamber 103. The inflation of the upper-rear inflation chamber 103 and the lower inflation chamber 101 stretches the vertical partition 60 and the lateral partition 50 in the automobile width direction as shown in FIGS. 9B and 15.

As the inflation of the upper-rear inflation chamber 103 progresses, some of the inflation gas in the upper-rear inflation chamber 103 flows into the upper-front inflation chamber 102 via the communication portions 71, so that the upper-front inflation chamber 102 starts inflating with a delay from the upper-rear inflation chamber 103.

The lower inflation chamber 101, the upper-rear inflation chamber 103, and the upper-front inflation chamber 102 are unfolded in the reverse order of that when these were folded. The airbag 40, which is deployed and inflated in the above described manner, pushes the seat pad 16 of the seat back 14, so that the seat pad 16 is broken at the breakable portion 21 (see FIG. 4). The airbag main body 41 is projected forward from the seat back 14 through the broken area while part of the airbag main body 41 is remaining in the storage portion 18.

The airbag 40, which continues being supplied with inflation gas, is deployed while being unfolded forward between the body side portion 11 and the upper body of the occupant P seated in the automobile seat 12 as indicated by long dashed double-short dashed lines in FIGS. 2 and 3.

As shown in FIG. 14, the lower inflation chamber 101, the internal pressure of which is the highest, is deployed and inflated beside the lumbar region PP, which has the highest impact resistance in the side of the upper body of the occupant P. The upper-rear inflation chamber 103, the internal pressure of which is the second highest after the lower inflation chamber 101, is deployed and inflated beside the shoulder region PS, which has a higher impact resistance than the front half of the thorax PT, and beside the rear half of the thorax PT. The upper-front inflation chamber 102, the internal pressure of which is lower than the upper-rear inflation chamber 103, is deployed and inflated beside the front half of the thorax region PT, which has a lower impact resistance than the shoulder region PS and the rear half of the thorax region PT.

The upper body of the occupant (the lumbar region PP, the shoulder region PS, and the thorax region PT) is restrained by the lower inflation chamber 101, the upper-rear inflation chamber 103, and the upper-front inflation chamber 102 with a pressure distribution appropriate for the respective impact resistances. As a result, the impact from the side, which is transmitted via the body side portion 11, is reduced by the lower inflation chamber 101, the upper-rear inflation chamber 103, and the upper-front inflation chamber 102, so that the lumbar region PP, the shoulder region PS, and the thorax region PT are protected.

The rear ends of the first fabric portions 61, 62 of the vertical partition 60 are joined to the upper parts of the front ends of the second fabric portions 81, 82 of the inner tube 80. The inner tube 80 may be fixed to the side frame portion 15 using the bolts 33, 34 and the nuts 35. On the other hand, the front ends of the first fabric portions 61, 62 of the vertical partition 60 are joined to the main body fabric portions 43, 44 at locations forward of and away from the inner tube 80, respectively.

Thus, as shown in FIG. 15, as the upper-rear inflation chamber 103 is deployed and inflated, the first fabric portions 61, 62 (the base fabric portions 63) of the vertical partition 60, which is stretched in the front-rear direction and the automobile width direction, is strained in a direction inclined relative to the front-rear direction such that the space between the first fabric portions 61, 62 increases toward the front end. The strained first fabric portions 61, 62 (the base fabric portions 63) of the vertical partition 60 restrict forward deployment and inflation of the upper-rear inflation chamber 103.

The upper-rear inflation chamber 103 is inflated in the automobile width direction, in which the inflation thickness is less restricted by the vertical partition 60 than in the front-rear direction. When the inflation of the airbag main body 41 is completed, the inflation thickness of the upper-rear inflation chamber 103 is greater than that in a case in which the rear ends of the first fabric portions 61, 62 are joined to the main body fabric portions 43, 44 at locations away from the positions of the bolts 33, 34, where the airbag main body 41 is fixed to the automobile 10 (the side frame portion 15).

Particularly, in the present embodiment, in which the first fabric portions 61, 62 of the vertical partition 60 are attached to the main body fabric portions 43, 44 respectively, the inflation thickness of the upper-rear inflation chamber 103 in the automobile width direction increases on both sides in the automobile width direction. Therefore, the upper-rear inflation chamber 103 is inflated by a greater amount in the automobile width direction than that in a case in which only one of the main body fabric portions 43, 44 has the first fabric portions 61, 62 of the vertical partition 60. This increases the inflation thickness of the upper-rear inflation chamber 103 in the automobile width direction.

As a result, although the upper-rear inflation chamber 103 is inflated and deployed with a lower internal pressure than that of the lower inflation chamber 101, the upper-rear inflation chamber 103 is largely inflated in the automobile width direction to have a great inflation thickness in the automobile width direction. Accordingly, a greater amount of energy can be absorbed.

When the discharge of inflation gas from the inflator 31 stops and the inflation gas in the lower inflation chamber 101 acts to flow to the upper-rear inflation chamber 103, the valve members 91, 92 of the check valve 90 are pushed by the high pressure in the lower inflation chamber 101 and contact each other as indicated by the long dashed double-short dashed lines in FIG. 11B. The check valve 90 is thus closed and restricts the inflation gas in the lower inflation chamber 101 from flowing out to the upper-rear inflation chamber 103 through the space between the valve members 91, 92. Therefore, the internal pressure of the lower inflation chamber 101, which has been increased to a level adequate for protecting the lumbar region PP of the occupant P, or an internal pressure higher than that of the upper-rear inflation chamber 103, is restrained from being reduced by outflow.

As shown in FIG. 14, excessive inflation gas in the lower inflation chamber 101 is discharged forward and downward of the airbag 40 via the second vent hole 97. Also, excessive inflation gas in the upper-front inflation chamber 102 is discharged forward of the airbag 40 via the first vent hole 95. In this manner, when the occupant P is restrained by the airbag 40, the internal pressures of the lower inflation chamber 101 and the upper inflation chamber are lowered, so that the upper body of the occupant P is pushed with an adequate pressing force.

In the airbag main body 41 in an uninflated and spread state, the lateral partition 50 can be configured to bridge between the main body fabric portions 43, 44 by joining the lower ends of the third fabric portions 51, 52 to each other with a lateral joint portion, while maintaining the locations of the third fabric portions 51, 52 of the lateral partition 50 joined to the main body fabric portions 43, 44. In this case, the lateral joint portion is located at a location lower than the locations of the third fabric portions 51, 52 that are joined to the main body fabric portions 43, 44 (the second lateral joint portions 53, 54). This causes the lateral joint portion to be close to the lower end of the airbag main body 41 (the lower end of the peripheral joint portion 45) so that the space between the lateral joint portion and the lower end of the airbag main body 41 is decreased.

Thus, when there is a demand for a raised position of the lower end of the airbag main body 41, such a demand is hard to meet since the lower end of the airbag main body 41 may contact the lateral partition 50 (the lateral joint portion).

In this regard, the upper ends of the third fabric portions 51, 52 are joined together by the third lateral joint portion 55 in the present embodiment. The third lateral joint portion 55 is located at a location higher than the locations of the third fabric portions 51, 52 that are joined to the main body fabric portions 43, 44 (the second lateral joint portions 53, 54). This causes the third lateral joint portion 55 to be separated away from the lower end of the airbag main body 41 (the lower end of the peripheral joint portion 45) so that the space between the third lateral joint portion 55 and the lower end of the airbag main body 41 is increased. Thus, even if the position of the lower end of the airbag main body 41 is raised, the lower end of the airbag main body 41 is unlikely to contact the lateral partition 50 (the third lateral joint portion 55).

The present embodiment as described above achieves the following advantages.

(1) The vertical partition 60 is configured by the first fabric portions 61, 62 arranged in the automobile width direction, and the inner tube 80 is configured by the second fabric portions 81, 82 arranged in the automobile width direction. The rear ends of the first fabric portions 61, 62 of the vertical partition 60 are joined to the upper parts of the front ends of the second fabric portions 81, 82 of the inner tube 80 with the first vertical joint portion 69 (FIG. 8).

Figure 16:
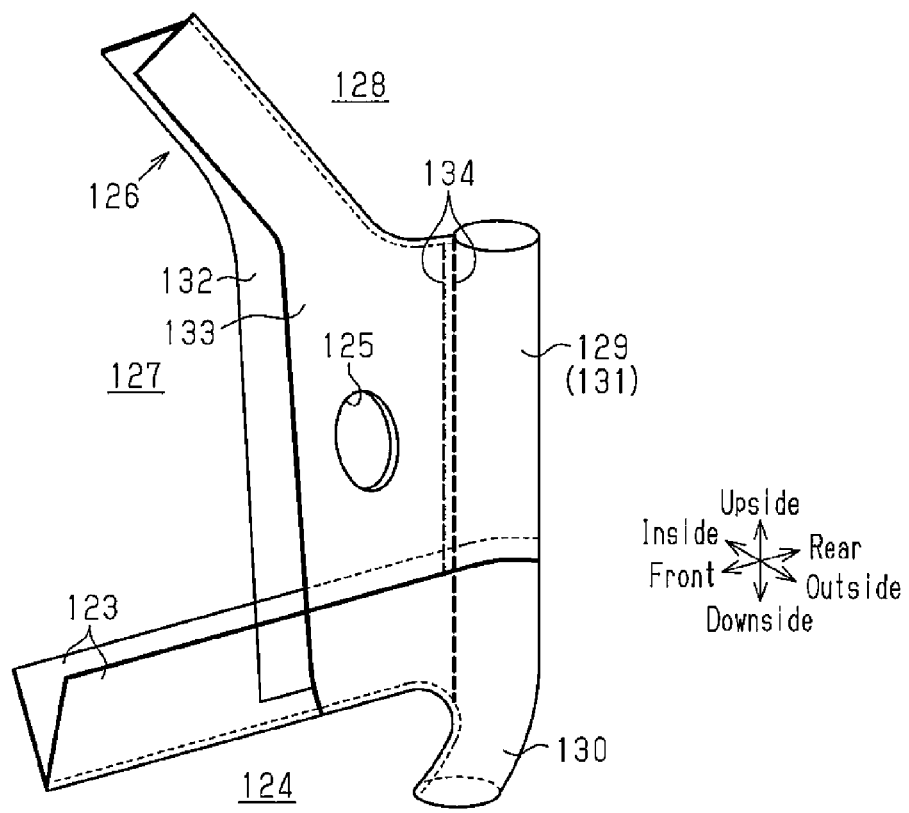
FIG. 16 is a perspective view of a conventional side airbag apparatus, showing the positional relationship among the inner tube, the vertical partition, and the lateral partition.
Figure 17:
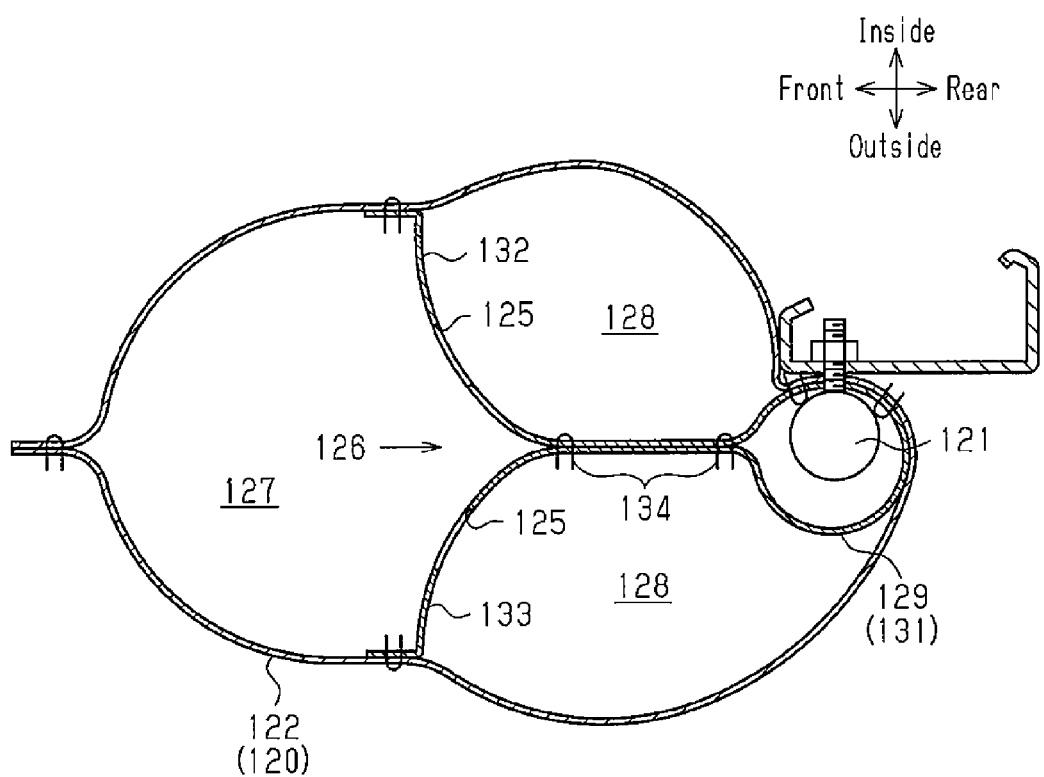
FIG. 17 is a cross-sectional plan view of the conventional side airbag apparatus, showing the internal structure of the side airbag apparatus when the airbag main body is deployed and inflated.

At the joining operation using the first vertical joint portion 69, the rear ends of the first fabric portions 61, 62 of the vertical partition 60 and the upper parts of the front ends of the second fabric portions 81, 82 of the inner tube 80 are used as locations to be joined. That is, the rear ends of the first fabric portions 61, 62 and the upper parts of the front ends of the second fabric portions 81, 82 serve as marks to join the inner tube 80 and the vertical partition 60. This allows the locations at which the first vertical joint portion 69 is formed to be easily determined. That is, the first vertical joint portion 69 is easily positioned. As a result, compared to Japanese Laid-Open Patent Publication No. 2015-30322, in which the inner tube 129 and the vertical partition 126 are formed by the single fabric piece 131 (FIGS. 16 and 17), the vertical partition 60 can be accurately joined to the inner tube 80.

(2) The upper parts of the front ends of the second fabric portions 81, 82 of the inner tube 80 are arranged between the rear ends of the first fabric portions 61, 62 of the vertical partition 60 and overlaid on the rear ends. The upper parts of the front ends of the second fabric portions 81, 82 and the rear ends of the first fabric portions 61, 62 are overlaid on each other and joined by the first vertical joint portion 69 (FIG. 8).

Thus, the location at which the first vertical joint portion 69 is formed is easily determined by overlaying the upper parts of the front ends of the second fabric portions 81, 82 of the inner tube 80 and the rear ends of the first fabric portions 61, 62 of the vertical partition 60 on each other. That is, the first vertical joint portion 69 can be easily positioned, so that the advantage of item (1) is obtained.

(3) The vertical partition 60 is joined to the inner tube 80 with the first vertical joint portion 69 at a position in the second fabric portions 81, 82 of the inner tube 80 above the check valve 90 (FIG. 8). In the check valve 90, the front end of the inner-side second fabric portion 81 of the inner tube 80 is joined only to the front end of the outer-side second fabric portion 82 with the second vertical joint portion 83 (FIG. 10).

Thus, the first fabric portions 61, 62 of the vertical partition 60 can be accurately joined to parts of the fabric portions 81, 82 of the inner tube 80 that are above the check valve 90 (the upper parts of the front ends). The opening and closing operations of the check valve 90 are restrained from being influenced by the vertical partition 60.

(4) The lateral partition 50 is configured by the third fabric portions 51, 52, which are arranged in the automobile width direction. The valve members 91, 92 of the check valve 90 are configured by the lower parts of the second fabric portions 81, 82 of the inner tube 80. The valve members 91, 92 are arranged between and overlaid on the rear parts of the third fabric portions 51, 52 of the lateral partition 50. The rear part of the upper end of the inner-side third fabric portion 51 of the lateral partition 50 is joined to the upper end of the valve member 91 of the inner-side second fabric portion 81 of the inner tube 80 with the first lateral joint portion 56. The rear part of the upper end of the outer-side third fabric portion 52 of the lateral partition 50 is joined to the upper end of the valve member 92 of the outer-side second fabric portion 82 of the inner tube 80 with the first lateral joint portion 57 (FIGS. 11A, 11B).

Thus, the lateral partition 50 is properly joined to the inner tube 80.

(5) The middle sections in the front-rear direction of the third fabric portions 51, 52 of the lateral partition 50 are arranged between and overlaid on the lower parts of the first fabric portions 61, 62 of the vertical partition 60. The lower end of the inner-side first fabric portion 61 of the vertical partition 60 is joined to the middle section of the inner-side third fabric portion 51 of the lateral partition 50 with a part of the second lateral joint portion 53. The lower end of the outer-side first fabric portion 62 of the vertical partition 60 is joined to the middle section of the outer-side third fabric portion 52 of the lateral partition 50 with a part of the second lateral joint portion 54 (FIG. 13).

Thus, the vertical partition 60 is properly joined to the lateral partition 50.

(6) The airbag main body 41 is configured by the main body fabric portions 43, 44, which are arranged in the automobile width direction. The upper ends of locations of the third fabric portions 51, 52 of the lateral partition 50 that are forward of the inner tube 80 are joined to each other with the third lateral joint portion 55. The lower end of the inner-side third fabric portion 51 of the lateral partition 50 is joined to the inner-side main body fabric portion 43 of the airbag main body 41 with the second lateral joint portion 53. The lower end of the outer-side third fabric portion 52 of the lateral partition 50 is joined to the outer-side main body fabric portion 44 of the airbag main body 41 with the second lateral joint portion 54 (FIG. 13).

Thus, even if the position of the lower end of the airbag main body 41 is raised due to changes in the shape and the size of the airbag main body 41, the lower end is restrained from contacting the lateral partition 50 (the third lateral joint portion 55).

(7) The first fabric portions 61, 62 of the vertical partition 60 are joined to the inner tube 80, which is fixed to the side frame portion 15 (FIG. 15).

The first fabric portions 61, 62 of the strained vertical partition 60 restricts forward deployment and inflation of the upper-rear inflation chamber 103, so that the upper-rear inflation chamber 103 is largely inflated in the automobile width direction. A greater amount of the energy of an impact can be absorbed by the upper-rear inflation chamber 103, which is largely inflated in the automobile width direction to have a great inflation thickness. This improves the protection of the rear half of the thorax region PT and the shoulder region PS.

As described above, forward deployment and inflation of the upper-rear inflation chamber 103 is restricted, so that the position of the front end of the upper-front inflation chamber 102 is located relatively rearward. Thus, even if there is an obstacle in front of the storage portion 18, the obstacle is restrained from being pushed hard by the airbag main body 41 (the upper-front inflation chamber 102).

The above-described embodiment may be modified as follows.

<Regarding Storage Portion 18 of Airbag Module ABM>

Instead of the seat back 14 of the automobile seat 12, the storage portion 18 may be located in the body side portion 11 to incorporate the airbag module ABM.

<Regarding Gas Generator 30>

The gas generator 30 may be configured only by the inflator 31, which has the bolts 33, 34, without using the retainer 32.

<Regarding Inflation Portion 46>

Substantially the entire airbag main body 41 may be configured to be inflated by the inflation portion 46 as in the above-illustrated embodiment, but may also partially include a non-inflation portion, which is neither supplied with inflation gas nor inflated.

The part of the upper body of the occupant P to be restrained and protected by the upper-rear inflation chamber 103 and the upper-front inflation chamber 102 may be different from that of the above illustrated embodiment.

For example, the upper-rear inflation chamber 103 may be deployed and inflated beside the thorax region PT, and the upper-front inflation chamber 102 may be deployed and inflated beside the space in front of the thorax region PT. In this case, the upper-front inflation chamber 102 may function to adjust the internal pressure of the upper-rear inflation chamber 103 by receiving the inflation gas that flows out of the upper-rear inflation chamber 103.

<Regarding Vertical Partition 60>

The inner-side first fabric portion 61 of the vertical partition 60 may be joined only to the inner-side second fabric portion 81 of the second fabric portions 81, 82 of the inner tube 80, and the outer-side first fabric portion 62 of the vertical partition 60 may be joined only to the outer-side second fabric portion 82 of the second fabric portions 81, 82 of the inner tube 80. In this case, an additional vertical joint portion for joining the second fabric portions 81, 82 of the inner tube 80 is needed.

The vertical partition 60 may have a shape different from that in the above illustrated embodiment. In this case, the shape of the vertical partition 60 is preferably changed in accordance with the location of the upper body of the occupant P to be restrained and protected by the upper-rear inflation chamber 103. For example, the upper parts of the first fabric portions 61, 62 of the vertical partition 60 do not necessarily need to be inclined but may extend substantially vertically.

<Regarding Inner Tube 80>

The inner tube 80 may surround the gas generator 30 except for the bolts 33, 34.

<Other Modifications>

Among the airbag main body 41, the lateral partition 50, the vertical partition 60, and the inner tube 80, which are main components configuring the airbag 40, the components other than the vertical partition 60 and the inner tube 80 may each be formed by a single fabric piece.

In the above illustrated embodiment, a pressure regulator valve may be provided that adjusts the opening degree of the communication portion 71 to regulate the internal pressures of the upper-rear inflation chamber 103 and the upper-front inflation chamber 102.

The present invention may be applied to a side airbag apparatus of an automobile in which a seat 12 is arranged such that a seat back 14 faces in a direction other than the forward direction, for example, sideways. In this case, when an impact is applied to a side of the automobile seat 12 (in the front-rear direction of the automobile), the side airbag apparatus protects the occupant P from the impact.

Automobiles to which the side airbag apparatus according to the present invention is applied include various industrial vehicles in addition to private cars.

The present invention can be applied to side airbag apparatuses that are mounted on vehicles other than automobiles, for example, airplanes, boats, and ships and protect occupants seated in vehicle seats from impacts.

The invention claimed is:

1. A side airbag apparatus comprising:
an airbag main body, which is configured to be deployed and inflated beside an occupant seated in a vehicle seat;
a gas generator, which supplies inflation gas to the airbag main body;
a lateral partition, which is arranged in the airbag main body and divides at least a part of an interior of the airbag main body into an upper inflation chamber and a lower inflation chamber, which is located below the upper inflation chamber;
a vertical partition, which is arranged in the airbag main body and has a communication portion, wherein the vertical partition divides the upper inflation chamber into an upper-rear inflation chamber, to which the inflation gas from the gas generator is supplied, and an upper-front inflation chamber, which is located forward of the upper-rear inflation chamber and to which the inflation gas is supplied via the communication portion; and
an inner tube, which is arranged in the airbag main body and regulates a flow of the inflation gas from the gas generator to direct the flow toward the upper-rear inflation chamber and the lower inflation chamber, wherein the inner tube includes, at a lower part, a check valve, which restricts a flow of the inflation gas from the lower inflation chamber to the upper-rear inflation chamber, wherein
the vertical partition includes two first fabric portions arranged in a width direction of the vehicle seat,
the inner tube includes two second fabric portions arranged in the width direction,
a rear end of each first fabric portion is joined to an upper part of a front end of at least one of the second fabric portions by a first vertical joint portion,
the vertical partition is joined to the inner tube by the first vertical joint portion at a position in the second fabric portions that is above the check valve,
in the check valve, a front end of one of the second fabric portions in the inner tube is joined only to a front end of the other second fabric portion by a second vertical joint portion,
the airbag main body includes two main body fabric portions arranged in the width direction, each first fabric portion is joined to a corresponding one of the two main body fabric portions by a third vertical joint portion, each first fabric portion includes a base fabric portion and an inclined fabric portion, which extends forward and upward from an upper end of the base fabric portion, each third vertical joint portion extends along a front periphery of the corresponding first fabric portion and includes a bent portion located between the base fabric portion and the inclined fabric portion of the first fabric portion, the first fabric portions are joined to each other by the first vertical joint portion, the first vertical joint portion extends along rear peripheries of the first fabric portions and includes a bent portion located between the base fabric portions and the inclined fabric portions of the first fabric portions, and the bent portion of the first vertical joint portion is located below the bent portions of the third vertical joint portions.

2. The side airbag apparatus according to claim 1, wherein the upper parts of the front ends of the second fabric portions of the inner tube are arranged between and overlaid on the rear ends of the first fabric portions of the vertical partition, and the upper parts of the front ends of the second fabric portions and the rear ends of the first fabric portions are overlaid on each other and joined by the first vertical joint portion.

3. The side airbag apparatus according to claim 1, wherein the lateral partition includes two third fabric portions arranged in the width direction, a lower part of each second fabric portion of the inner tube configures a valve member of the check valve, the valve members are arranged between and overlaid on rear parts of the third fabric portions of the lateral partition, and a rear part of an upper end of each third fabric portion of the lateral partition is joined, by a first lateral joint portion, to an upper end of the valve member of the adjacent one of the second fabric portions of the inner tube.

4. The side airbag apparatus according to claim 3, wherein the lateral partition includes two third fabric portions arranged in the width direction, middle portions of the third fabric portions with respect to a front-rear direction are arranged between and overlaid on lower parts of the first fabric portions of the vertical partition, and a lower end of each first fabric portion of the vertical partition is joined, by a second lateral joint portion, to the overlaid part of the adjacent one of the third fabric portions of the lateral partition.

5. The side airbag apparatus according to claim 3, wherein the airbag main body includes two main body fabric portions arranged in the width direction, upper ends of parts of the third fabric portions in the lateral partition that are forward of the inner tube are joined to each other by a third lateral joint portion, and a lower end of each third fabric portion in the lateral partition is joined, by a second lateral joint portion, to the adjacent one of the main body fabric portions of the airbag main body.

6. The side airbag apparatus according to claim 4, wherein the airbag main body includes two main body fabric portions arranged in the width direction, upper ends of parts of the third fabric portions in the lateral partition that are forward of the inner tube are joined to each other by a third lateral joint portion, and a lower end of each third fabric portion in the lateral partition is joined, by the second lateral joint portion, to the adjacent one of the main body fabric portions of the airbag main body.

7. The side airbag apparatus according to claim 1, wherein the bent portion of the first vertical joint portion has a curved shape, and the bent portion of each third vertical joint portion has a curved shape.

8. The side airbag apparatus according to claim 1, wherein the main body fabric portions are joined to each other by a peripheral joint portion, which is provided along peripheries of the main body fabric portions, the peripheral joint portion includes a section that joins rear ends of the second fabric portions to rear ends of the main body fabric portions, a lower end portion of the second vertical joint portion is inclined with respect to the section of the peripheral joint portion such that, toward a lower side, the lower end portion is away from the section of the peripheral joint portion.

* * * * *